(12) United States Patent
Norstad

(10) Patent No.: US 10,363,941 B2
(45) Date of Patent: Jul. 30, 2019

(54) SYSTEM AND METHOD FOR CONTROLLING A VEHICLE

(71) Applicant: Polaris Industries Inc., Medina, MN (US)

(72) Inventor: Tim P. Norstad, Turtle Lake, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/687,484

(22) Filed: Aug. 27, 2017

(65) Prior Publication Data

US 2018/0009443 A1 Jan. 11, 2018

Related U.S. Application Data

(62) Division of application No. 14/928,121, filed on Oct. 30, 2015, now Pat. No. 9,771,084.

(Continued)

(51) Int. Cl.
| | |
|---|---|
| *B60W 50/00* | (2006.01) |
| *B62D 6/00* | (2006.01) |
| *B60T 8/00* | (2006.01) |
| *B60G 17/018* | (2006.01) |
| *F02D 9/02* | (2006.01) |
| *B60K 5/00* | (2006.01) |

(Continued)

(52) U.S. Cl.
CPC ....... *B60W 50/0098* (2013.01); *B60G 17/016* (2013.01); *B60G 17/018* (2013.01); *B60G 17/02* (2013.01); *B60G 17/06* (2013.01); *B60K 5/00* (2013.01); *B60K 11/00* (2013.01); *B60T 8/00* (2013.01); *B60W 10/06* (2013.01); *B62D 5/0406* (2013.01); *B62D 5/0463* (2013.01); *B62D 5/0481* (2013.01); *B62D 6/002* (2013.01); *B62D 6/02* (2013.01); *F02D 9/02* (2013.01); *B60G 2300/07* (2013.01); *B60G 2300/124* (2013.01); *B60G 2300/13* (2013.01); *B60G 2500/10* (2013.01); *B60G 2500/20* (2013.01); *B60G 2500/30* (2013.01)

(58) Field of Classification Search
CPC ....... B60W 50/00; B60G 17/016; B26D 6/00; B26D 5/04
USPC .......................................................... 701/42
See application file for complete search history.

(56) References Cited

U.S. PATENT DOCUMENTS

| | | | |
|---|---|---|---|
| 5,000,278 A * | 3/1991 | Morishita | B62D 5/0463 180/446 |
| 9,381,810 B2 | 7/2016 | Nelson | |

(Continued)

FOREIGN PATENT DOCUMENTS

| | | |
|---|---|---|
| EP | 0361726 | 4/1990 |
| GB | 2262491 | 6/1993 |

(Continued)

OTHER PUBLICATIONS

International Preliminary Report on Patentability, issued by the International Searching Authority, dated Jan. 30, 2017, for related International patent application No. PCT/US2015/057132; 6 pages.

(Continued)

*Primary Examiner* — Tan Q Nguyen
(74) *Attorney, Agent, or Firm* — Faegre Baker Daniels LLP

(57) ABSTRACT

A vehicle is provided including an electronic power steering system, an electronic throttle control system, and a stability control system.

19 Claims, 11 Drawing Sheets

Related U.S. Application Data

(60) Provisional application No. 62/073,724, filed on Oct. 31, 2014.

(51) Int. Cl.
  | | |
  |---|---|
  | *B60K 11/00* | (2006.01) |
  | *B62D 5/04* | (2006.01) |
  | *B60G 17/016* | (2006.01) |
  | *B60W 10/06* | (2006.01) |
  | *B62D 6/02* | (2006.01) |
  | *B60G 17/02* | (2006.01) |
  | *B60G 17/06* | (2006.01) |

(56) References Cited

U.S. PATENT DOCUMENTS

| | | | | |
|---|---|---|---|---|
| 2001/0052756 A1* | 12/2001 | Noro | ............... | B62D 5/0463 318/432 |
| 2006/0191739 A1* | 8/2006 | Koga | ............... | B62D 5/0463 180/446 |
| 2007/0096672 A1* | 5/2007 | Endo | ............... | B62D 5/0472 318/432 |
| 2008/0004773 A1* | 1/2008 | Maeda | ............... | B62D 5/046 701/41 |
| 2008/0269989 A1* | 10/2008 | Brenner | ............... | B62D 6/007 701/42 |
| 2009/0308682 A1 | 12/2009 | Ripley | | |
| 2010/0145579 A1 | 6/2010 | O'Brien | | |
| 2011/0297462 A1* | 12/2011 | Grajkowski | ............... | B60K 26/04 180/54.1 |
| 2011/0301824 A1 | 12/2011 | Nelson | | |
| 2011/0301825 A1 | 12/2011 | Grajkowski | | |
| 2012/0191301 A1 | 7/2012 | Benyo | | |
| 2012/0191302 A1 | 7/2012 | Sternecker | | |
| 2013/0124045 A1 | 5/2013 | Suzuki | | |
| 2013/0173119 A1 | 7/2013 | Izawa | | |
| 2015/0329141 A1* | 11/2015 | Preijert | ............... | B62D 1/16 701/41 |
| 2016/0121905 A1 | 5/2016 | Gillingham | | |

FOREIGN PATENT DOCUMENTS

| | | |
|---|---|---|
| JP | 2001233228 | 8/2001 |
| KR | 20080090833 | 10/2008 |
| WO | WO 2016/069405 | 5/2016 |

OTHER PUBLICATIONS

International Search Report, issued by the International Searching Authority, dated May 13, 2016, for related International patent application No. PCT/US2015/057132; 6 pages.

Written Opinion of the International Searching Authority, issued by the International Searching Authority, dated Oct. 4, 2016, for related International patent application No. PCT/US2015/057132; 11 pages.

Article 34 Amendment, issued by the European Patent Office, dated Aug. 29, 2016, for related International patent application No. PCT/US2015/057132; 34 pages.

* cited by examiner

SYSTEM AND METHOD FOR CONTROLLING A VEHICLE

RELATED APPLICATIONS

This application is a divisional of Non-Provisional patent application Ser. No. 14/928,121 filed Oct. 30, 2015, which claims priority to Provisional Patent Application Ser. No. 62/073,724 filed Oct. 31, 2014; the subject matter of which are incorporated herein by reference.

FIELD OF THE DISCLOSURE

The present disclosure relates to a vehicle and more particularly to control strategies for recreational and utility vehicles.

BACKGROUND AND SUMMARY

Some recreational vehicles, such as all-terrain vehicles (ATV's), utility vehicles, motorcycles, etc., include a power steering system. Electronic power steering systems often use a detected ground speed to determine the level of steering torque assist to provide to the steering assembly. In these systems, the power steering will not function properly when ground speed data is faulty or unavailable. In addition, the calibration of a power steering unit may drift over time, resulting in a steering offset bias.

The stability of recreational vehicles may be assessed by stability tests, such as a static (KST) stability test, a rollover resistance rating (RRR) test, and a J-Turn test. Many recreational vehicles lack an active stability control system.

In an exemplary embodiment of the present disclosure, a vehicle is provided including an electronic power steering system, an electronic throttle control system, and a stability control system.

More particularly in a first embodiment, a power steering method for a vehicle is disclosed, where the method includes detecting, by a controller of a power steering system, a speed of an engine of the vehicle; determining, by the controller, a power steering assist level based on the engine speed; and outputting, by the power steering system, steering torque assistance to a steering assembly of the vehicle based on the power steering assist level.

In another embodiment, a power steering method for a vehicle includes detecting, by a controller of a power steering system, an error with a ground speed feedback signal; changing, by the controller, a power steering assist control mode from a first control mode to a second control mode in response to detecting the error with the ground speed feedback signal, wherein in the first control mode the controller determines a power steering assist level based on the ground speed feedback signal and in the second control mode the controller determines the power steering assist level based on at least one of a throttle valve opening, a detected engine speed, and a predetermined fixed ground speed; and outputting, by the power steering system, steering torque assistance to a steering assembly of the vehicle based on the power steering assist level.

In another embodiment, a power steering method for a vehicle includes detecting, by a controller of a power steering system, a selected gear of a transmission of the vehicle; determining, by the controller, a power steering assist level based on the selected gear of the transmission and a user torque input to a steering assembly of the vehicle; and outputting, by the power steering system, steering torque assistance to the steering assembly of the vehicle based on the power steering assist level.

In another embodiment, a power steering system for a vehicle, includes a steering assembly including a steering shaft; a sensor operative to detect a speed of an engine of the vehicle; and a power steering unit including a controller in communication with a motor, the motor being operably coupled to the steering shaft, the controller including control logic operative to determine a power steering assist level based on the engine speed, the controller controlling the motor to output steering torque assistance to the steering shaft based on the power steering assist level.

In another embodiment, a method for controlling a power steering system of a vehicle including: detecting, by a controller of the power steering system, a trigger event; in response to detecting the trigger event, determining, by the controller, a torque offset of the power steering system; and in response to the torque offset exceeding a threshold for each of a plurality of occurrences of the trigger event, determining, by the controller, a torque offset correction value; and controlling, by the controller, a steering torque assistance applied by the power steering system to a steering assembly of the vehicle based on the torque offset correction value.

In yet another embodiment, a recreational vehicle includes a chassis; an engine supported by the chassis; a ground engaging member; a steering assembly operably coupled to the ground engaging member; a power steering system including a steering shaft, a power steering unit, and a controller in communication with the power steering unit; and a torque sensor in communication with the controller, the controller being operative to detect a trigger event, in response to the detection of the trigger event, determine a torque offset of the power steering system based on output from the torque sensor, in response to the torque offset of the steering shaft exceeding a threshold for each of a plurality of occurrences of the trigger event, determine a torque offset correction value, and control a steering torque assistance applied by the power steering system to the steering assembly based on the torque offset correction value.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
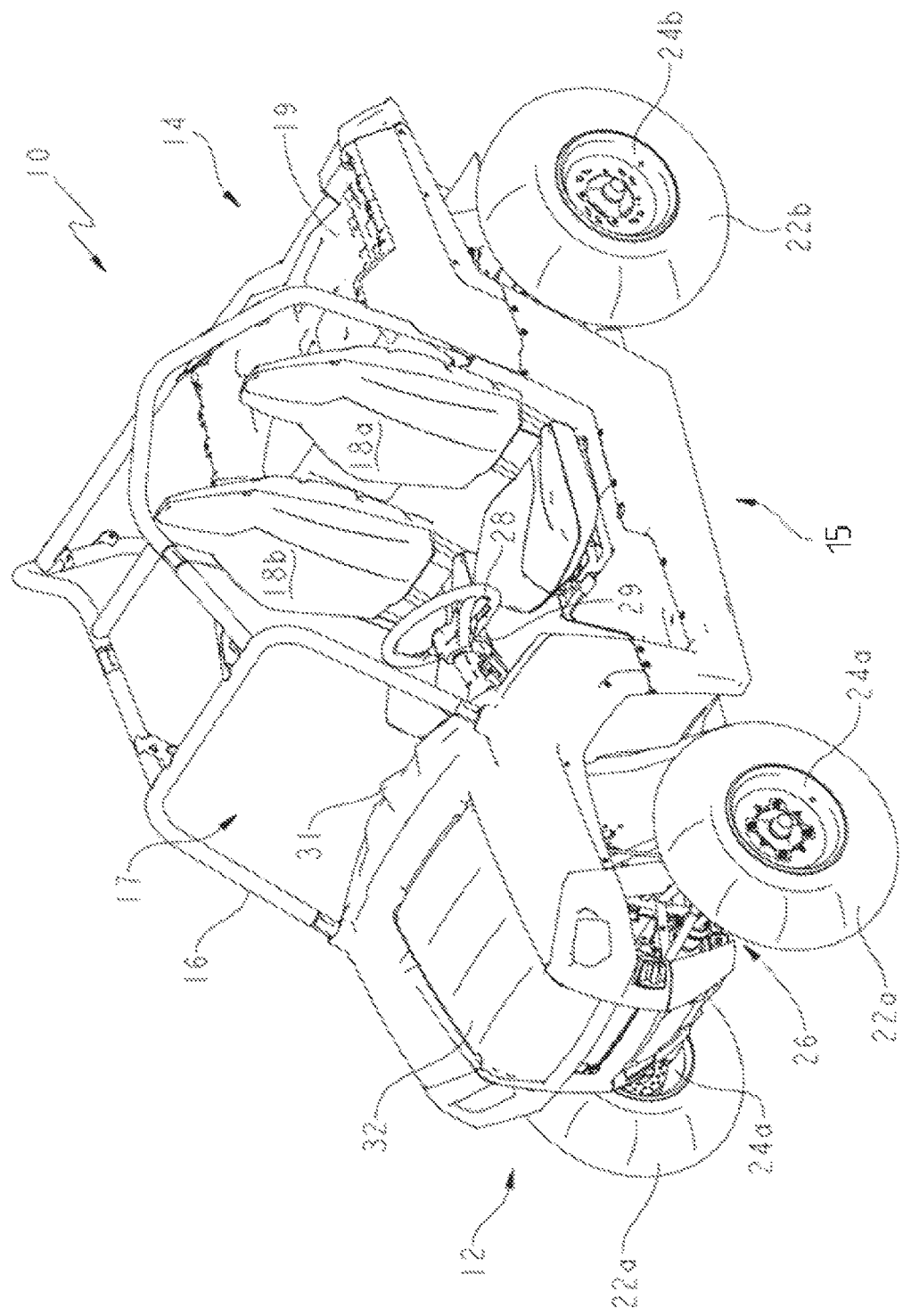
FIG. 1 is a perspective view of an exemplary vehicle incorporating the control strategies of the present disclosure.

Referring initially to FIG. 1, an exemplary vehicle 10 is illustrated that implements the control strategies disclosed herein. Vehicle 10 is illustratively a side-by-side ATV 10 including a front end 12, a rear end 14, and a frame or chassis 15 that is supported above the ground surface by a pair of front tires 22a and wheels 24a and a pair of rear tires 22b and wheels 24b. Vehicle 10 includes a pair of laterally spaced-apart bucket seats 18a, 18b, although a bench style seat or any other style of seating structure may be used. Seats 18a, 18b are positioned within a cab 17 of vehicle 10. A protective cage 16 extends over cab 17 to reduce the likelihood of injury to passengers of vehicle 10 from passing branches or tree limbs and to act as a support in the event of a vehicle rollover. Cab 17 also includes front dashboard 31, adjustable steering wheel 28, and shift lever 29. Front dashboard 31 may include a tachometer, speedometer, a display, or any other suitable instrument.

Front end 12 of vehicle 10 includes a hood 32 and a front suspension assembly 26. Front suspension assembly 26 pivotally couples front wheels 24a to vehicle 10. Rear end 14 of vehicle 10 includes an engine cover 19 which extends over an engine 130 and transmission assembly 122 (see FIG. 2). Rear end 14 further includes a rear suspension assembly (not shown) pivotally coupling rear wheels 24b to vehicle 10. Other suitable vehicles may be provided, such as a snowmobile, a straddle-seat vehicle, a utility vehicle, a motorcycle, and other recreational and non-recreational vehicles.

Figure 2:
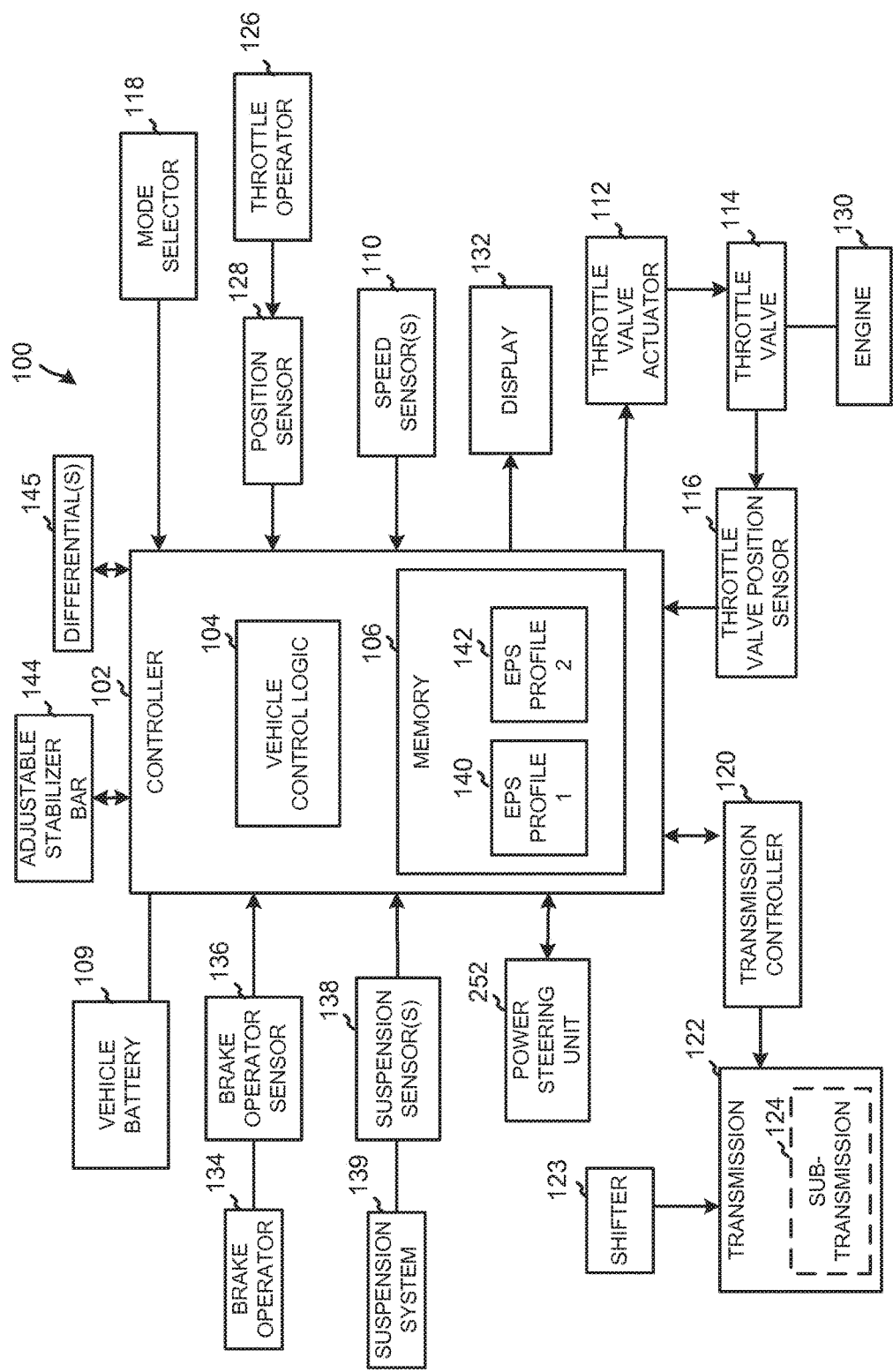
FIG. 2 is a representative view of an exemplary control system of the vehicle of FIG. 1 including a vehicle and engine controller, a transmission controller, and a power steering unit.

Referring to FIG. 2, an exemplary control system 100 of vehicle 10 is illustrated. Control system 100 includes a controller 102, such as a vehicle control module and/or an engine control module, having vehicle control logic 104 that controls the engine 130, various subsystems, and electrical components of vehicle 10. Controller 102 includes one or more processors that execute software and/or firmware code stored in an internal or external memory 106 of controller 102. The software/firmware code contains instructions that, when executed by the one or more processors of controller 102, causes controller 102 to perform the functions described herein. Controller 102 may alternatively include one or more application-specific integrated circuits (ASICs), field-programmable gate arrays (FPGAs), digital signal processors (DSPs), hardwired logic, or combinations thereof. Controller 102 may include one or more physical control modules.

Memory 106 is any suitable computer readable medium that is accessible by the processor(s) of controller 102. Memory 106 may be a single storage device or multiple storage devices, may be located internally or externally to controller 102, and may include both volatile and non-volatile media. Exemplary memory 106 includes random-access memory (RAM), read-only memory (ROM), electrically erasable programmable ROM (EEPROM), flash memory, CD-ROM, Digital Versatile Disk (DVD) or other optical disk storage, a magnetic storage device, or any other suitable medium which is configured to store data and which is accessible by controller 102.

Control system 100 further includes at least one vehicle battery 109 (e.g., 12 VDC) for providing power to the electrical components of control system 100, such as controller 102, sensors, switches, lighting, ignition, accessory outlets, and other powered components. One or more speed sensors 110 provide speed feedback to controller 102, such as the engine speed, vehicle speed, PTO shaft speed, or other drive line speeds. For example, sensors 110 may include an engine RPM sensor, a wheel speed sensor, a transmission speed sensor, and/or other suitable speed sensors. A brake operator sensor 136 detects a position of a brake operator 134 and/or an applied pressure to brake operator 134 of vehicle 10. Brake operator 134 may include a pedal, a hand brake, or another suitable operator input device that, when actuated by an operator, is configured to provide an operator brake demand to controller 102.

Controller 102 is operative to output an electrical signal to a throttle valve actuator 112 to control a position or opening of a throttle valve 114 of engine 130. Controller 102 electronically controls the position of throttle valve 114 of engine 130 based on the detected position of a throttle operator 126 to regulate air intake to and thus the speed of engine 130. Throttle operator 126 may include an accelerator pedal, a thumb actuated lever, a twist grip, or any other suitable operator input device that, when actuated by an operator, is configured to provide an operator throttle demand to controller 102. A throttle operator position sensor 128 coupled to and in communication with controller 102 provides signal feedback to controller 102 indicative of the position of a throttle operator 126. A throttle valve position sensor 116 provides feedback to controller 102 indicative of the actual position or degree of opening of throttle valve 114. For additional disclosure of electronic throttle control provided with controller 102, see U.S. patent application Ser. No. 13/152,981, filed Jun. 3, 2011, entitled ELECTRONIC THROTTLE CONTROL, the entire disclosure of which is expressly incorporated by reference herein. In an alternative embodiment, vehicle 10 is an electric vehicle or hybrid-electric vehicle and includes one or more electric motors for powering the vehicle, and throttle operator 126 provides a torque demand to controller 102 for controlling the electric motor(s).

Control system 100 further includes a power steering assist unit (EPAS) 252 in communication with controller 102. In the illustrated embodiment, power steering unit 252 includes an electronic power steering unit 252 operative to provide steering assist to the steering assembly of vehicle 10, as described herein.

Vehicle 10 further includes a transmission controller 120 in communication with controller 102 that is operative to control a transmission 122 of vehicle 10. Transmission controller 120 includes one or more processors that execute software and/or firmware code stored in an internal or external memory of transmission controller 120. The software/firmware code contains instructions that, when executed by the one or more processors of controller 120, causes controller 120 to perform transmission control functions.

In one embodiment, transmission 122 is an electronically controlled continuously variable transmission (CVT). In this embodiment, transmission 122 further includes a sub-transmission 124 coupled to an output of the CVT 122. In one embodiment, sub-transmission 124 is geared to provide a high gear (high range), a neutral gear, a low gear (low range), a reverse gear, and a park configuration for vehicle 10 of FIG. 1. Fewer or additional gears may be provided with sub-transmission 124. See, for example, the exemplary continuously variable transmission and sub-transmission disclosed in U.S. patent application Ser. No. 13/652,253, filed Oct. 15, 2012, entitled PRIMARY CLUTCH ELECTRONIC CVT, the entire disclosure of which is expressly incorporated by reference herein. Alternatively, transmission 122 may include any other suitable transmission types, such as a discrete ratio transmission, automatic or manual transmission, hydrostatic transmission, etc. One or more shifters 123 operated by an operator are configured to select a transmission gear of transmission 122 and/or sub-transmission 124.

One or more suspension sensors 138 provide feedback to controller 102 indicative of a suspension height or displacement (e.g., compression or extension) of the vehicle suspension system 139. For example, suspension sensors 138 may include shock position sensors and/or spring position sensors providing position feedback of the shock absorbers and springs or other suspension components of vehicle 10. In one embodiment, suspension sensors 138 are positioned internal to shocks of suspension system 139 or mounted to control arms of system 139. In one embodiment, a display 132 is coupled to controller 102 for displaying vehicle operation information to an operator. Exemplary information provided on display 132 includes vehicle speed, engine speed, fuel level, clutch position or gear ratio, selected transmission mode (e.g., auto, manual, hydrostatic), a selected terrain mode (e.g., pavement, ice/snow, gravel, rock, etc.), transmission gear, etc. In one embodiment, controller 102 communicates with one or more sensors/devices of vehicle 10 and/or other vehicle controllers via controller area network (CAN) communication.

Figure 3:
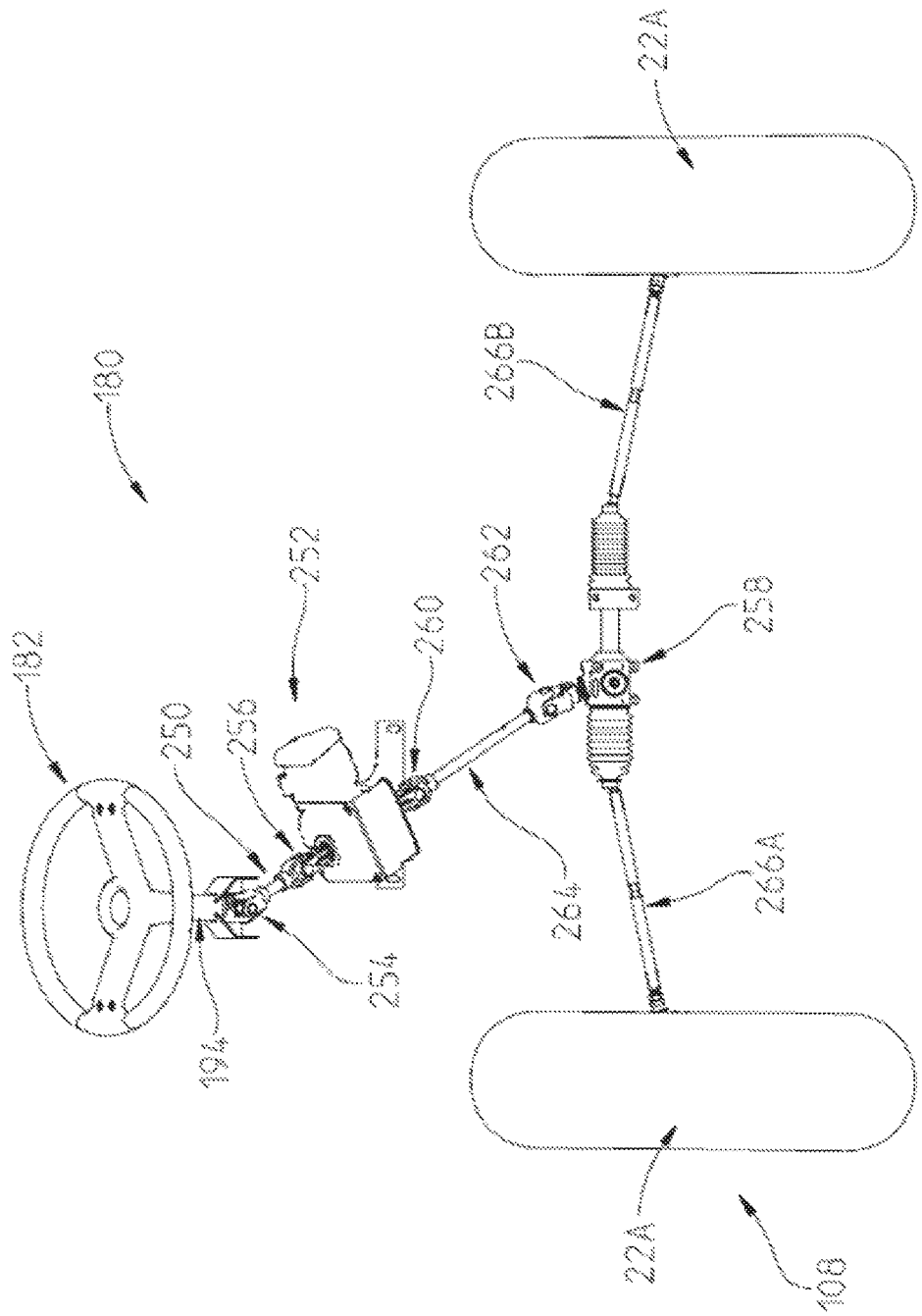
FIG. 3 illustrates an electrical power steering unit incorporated into a steering assembly of the vehicle of FIG. 1.

Referring to FIG. 3, an exemplary steering assembly 180 and exemplary power steering assist unit 252 of vehicle 10 of FIG. 1 is illustrated. Steering assembly 180 includes a steering wheel 182 coupled to a steering column 194. Other suitable operator steering devices may be provided. Steering column 194 is in turn coupled to power steering unit 252 through a steering shaft 250 coupled to steering column 194 at a first U-joint 254 and coupled to power steering unit 252 at a second U-joint 256. Power steering unit 252 is coupled to a steering rack 258 through a third U-joint 260 and a fourth U-joint 262 with a steering shaft 264 disposed therebetween. In another embodiment, third u-joint 260, fourth u-joint 262, and steering shaft 264 are omitted such that power steering unit 252 is coupled directly to steering rack 258.

Steering rack 258 is coupled to ground engaging members 22a of a front axle 108 of vehicle 10 through steering rods 266A and 266B, respectively. The steering rods 266A, 266B are coupled to respective steering posts provided on a respective wheel carrier of wheels 24a (FIG. 1). The movement of steering wheel 182 causes movement of the steering rods 266A, 266B, and this movement of the steering rods 266A, 266B is transferred to the respective wheel carrier to rotate about an axis to turn ground engaging members 22a. For additional detail of an exemplary steering assembly, see U.S. application Ser. No. 12/135,107, filed Jun. 6, 2008, entitled VEHICLE, the entire disclosure of which is expressly incorporated by reference herein.

Figure 4:
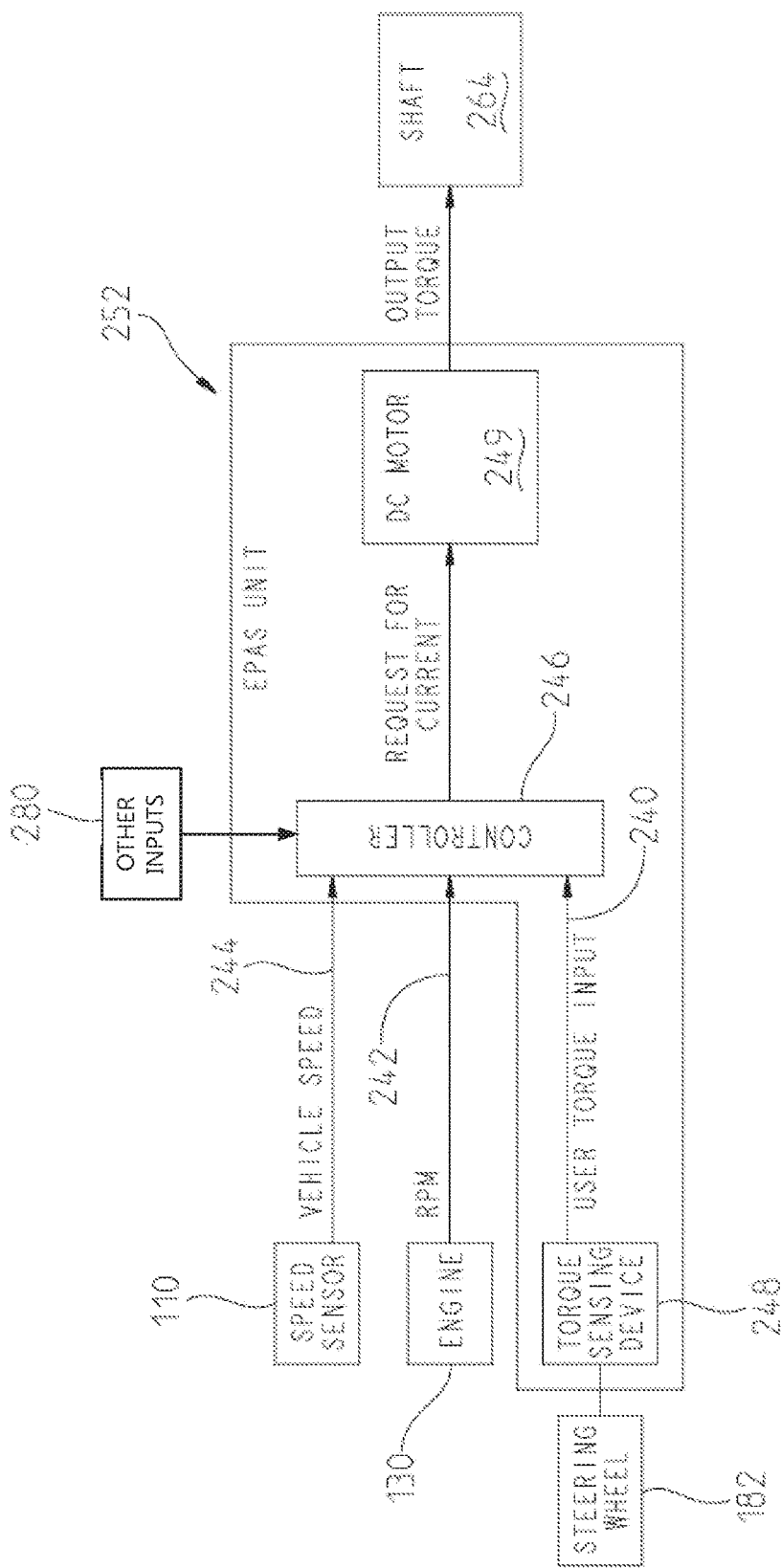
FIG. 4 is a representative view of the power steering unit of FIG. 2.

In the illustrated embodiment, power steering unit 252 is an electric power steering unit that receives power from the electrical system of vehicle 10. In one embodiment, power steering unit 252 is programmable to account for different vehicle conditions and/or operator preferences. Referring to FIG. 4, an exemplary embodiment of a power steering unit 252 includes a controller 246 and a motor 249, illustratively a direct current (DC) motor 249. Controller 246 includes one or more processors that execute software and/or firmware code stored in an internal or external memory to perform the power steering operations described herein. Controller 246 receives a user torque input 240 from the vehicle operator (through shaft 250 of FIG. 3), a revolutions per minute (rpm) input 242 from the power source (engine 130 or electric motor), and a vehicle speed input 244 from a speed sensor 110. Inputs 240, 242, and/or 244 may include CAN bus signals or discrete signals, such as frequency or pulse input signals or analog voltage signals. Controller 246 provides a current signal to electric motor 249 based on inputs 240, 242, 244. Shaft 264 is mechanically coupled to shaft 250 (FIG. 3) through power steering unit 252. Motor 249 is also coupled to steering shaft 264 through a gear set and provides assistance to rotate steering shaft 264 in addition to the force applied through shaft 250 by the operator.

The user torque input 240 is generated by turning steering wheel 182 and is measured by a torque sensing device 248 which is illustratively housed within power steering unit 252. Torque sensing device 248 measures the angular displacement between two shafts connected by a torsional element (e.g., one of the shafts responsive to the movement of steering shaft 250 or being the steering shaft 250). The angular displacement is converted to a torque value. The torque value is received by controller 246 and is used by controller 246 to determine an amount of assist which power steering unit 252 should provide through motor 249 and the direction in which the assist needs to be supplied (left turn or right turn). The vehicle speed input 244 is also used to vary the amount of assist provided by power steering unit 252 depending on the speed of vehicle 10.

In one embodiment, controller 246 receives additional inputs 280 (e.g., maximum RPM, maximum ground speed, transmission gear, etc.) used for calculating the level of the steering torque assist, as described herein. In one embodiment, controller 246 is in communication with controller 102 of FIG. 2 (which is illustratively external to power steering unit 252) to obtain speed profiles and additional inputs 280. For example, memory 106 of controller 102 may include one or more electronic power steering (EPS) speed profiles 140, 142 (see FIG. 2) which define the amount of current to motor 249 of power steering unit 252 based on vehicle speed, user torque input, and other variables to vary the torque assistance level provided to steering shaft 264. In one example, the speed profile 140, 142 has distinct constant assist levels based on vehicle speed and user torque input 240. In another example, the assist levels of the speed profiles 140, 142 vary over a range of vehicle speeds. In one embodiment, the RPM input 242 provides an indication of whether engine 130 is running or not running. Controller 246 may enable or disable the steering torque assist based on whether engine 130 is running.

In one embodiment, a first speed profile 140 of FIG. 2 provides that at speeds below a threshold speed power steering unit 252 provides a first amount of steering effort and assist to steering shaft 264 and at speeds above the threshold speed power steering unit 252 provides a second amount of steering effort and assist to steering shaft 264, the second amount being lower than the first amount. In one example, the second amount is no assist. In one embodiment, the amount of assist varies over a range of speeds (e.g., proportionally or otherwise) and is not limited to two discrete speeds.

Figure 5:
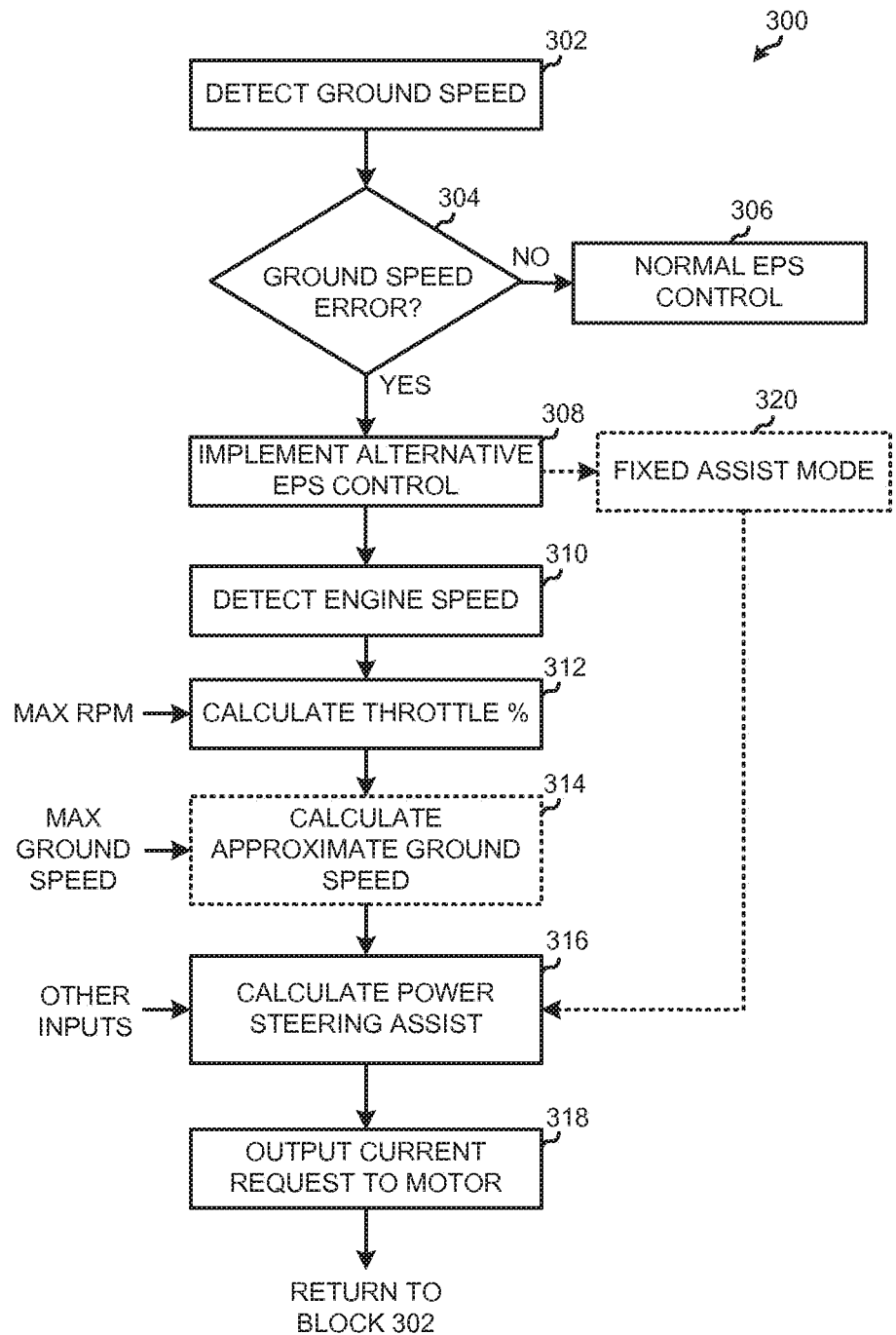
FIG. 5 is a block diagram illustrating an exemplary method for calculating a level of power steering assist according to some embodiments.

FIG. 5 is a flow diagram 300 illustrating an exemplary operation performed by power steering controller 246 (or vehicle controller 102) for determining a level of steering torque assistance provided by power steering unit 252 to shaft 264 when vehicle speed feedback 244 is faulty or unavailable due to, for example, sensor error or other fault. Reference is made to FIGS. 2-4 throughout the description of FIG. 5.

At block 302, controller 246 detects the vehicle ground speed based on feedback 244 from vehicle speed sensor 110. At block 304, controller 246 determines whether the ground speed feedback 244 has an error. For example, a ground speed error may include the detected ground speed having an erroneous value or a value that exceeds the capability of the vehicle, the detected ground speed changing at a rate that exceeds a threshold rate (for example, a threshold rate that corresponds to a maximum possible change in vehicle speed of vehicle 10), or controller 246 failing to detect a ground speed. If controller 246 does not detect a ground speed signal error, controller 246 performs normal power steering control at block 306 based on the detected ground speed, speed maps, and/or other suitable inputs, as described above. If controller 246 detects a ground speed signal error at block 304, controller 246 proceeds to block 308 to implement an alternative power steering assist control scheme to determine the applied amount of power steering assistance using inputs other than detected ground speed. In the illustrated embodiment, controller 246 implements the alternative power steering assist control scheme illustrated in blocks 310-318.

At block 310, controller 246 detects the engine speed (RPM) of engine 130 based on sensor output. At block 312, controller 246 calculates an approximate throttle valve 114 opening percentage based on the detected engine speed and a maximum engine speed value stored in memory, based on the following Equation (1):

$$\text{Percentage Full Throttle} = (\text{Detected RPM})/(\text{Max. RPM}) \quad (1)$$

In one embodiment, controller 246 optionally calculates an approximate ground speed of vehicle 10 at block 314 based on the detected engine speed, the preset maximum engine speed value, and a preset maximum ground speed value of vehicle 10, based on the following Equation (2):

$$\text{Approx. Ground Speed} = [(\text{Detected RPM})/(\text{Max. RPM})] \times (\text{Max. Ground Speed}) \quad (2)$$

At block 316, controller 246 calculates the level of power steering torque assist to apply to shaft 264. In one embodiment, controller 246 calculates the steering torque assist level based on the estimated throttle valve 114 opening percentage determined with Equation (1) and the user torque input 240 detected with torque sensing device 248. For example, for a greater estimated throttle opening, the torque assist level may be reduced for a same user torque input 240, and for a lesser estimated throttle opening, the torque assist level may be increased for the same user torque input 240. The torque assist level for a given user torque input 240 may have several discrete levels based on multiple throttle opening percentage thresholds or may be proportional to the throttle opening percentage threshold. In one embodiment, utilizing an estimated throttle opening based on engine speed with Equation (1), rather than utilizing an unfiltered, actual throttle opening detected with throttle valve position sensor 116 (FIG. 2), provides for smoother adjustment to the steering assist level by controller 246 as a result of the engine speed changing less rapidly than corresponding changes in the throttle opening. As such, in this embodiment, the torque assist level is configured to change less rapidly or abruptly than if the torque assist level was based on the unfiltered, actual throttle opening percentage detected with position sensor 116.

Alternatively, controller 246 may calculate the power steering torque assist level based on filtered throttle valve position data. In this embodiment, a smoothing or averaging filter is applied to the throttle valve position feedback output by throttle valve position sensor 116 (FIG. 2) to reduce the likelihood that rapid or abrupt changes in the throttle valve position result in rapid or abrupt changes to the level of steering torque assist, thereby providing a smooth transition between levels of steering torque assist as the throttle opening changes. The filter may include logic in controller 246 operative to smooth or average the output signal from position sensor 116.

In another embodiment, controller 246 calculates the steering torque assist level based on the estimated ground speed determined with Equation (2) and the user torque input 240 detected with torque sensing device 248. In this embodiment, controller 246 may use the estimated ground speed to determine the steering torque assist level based on the speed profiles, such as speed profiles 140, 142 described herein. In some embodiments, a predetermined offset is subtracted from the estimated ground speed from Equation (2) to account for potential errors or inaccuracies in the ground speed calculation, and the resulting adjusted estimated ground speed is used by controller 246 to determine the steering torque assist level. In some embodiments, controller 246 may use filtered actual throttle valve position data, as described above, instead of the estimated throttle opening percentage to estimate the ground speed in block 314, i.e., the maximum ground speed multiplied by the filtered (e.g., averaged or smoothed) actual throttle opening percentage.

At block 318, controller 246 outputs a current request to motor 249 to output steering torque to shaft 264 at the steering torque assist level calculated at block 316.

In one embodiment, controller 246 provides zero steering torque assist above a certain threshold, such as above a particular throttle opening percentage threshold or above an estimated ground speed threshold. In one embodiment, controller 246 provides larger or full steering torque assist below a particular throttle opening percentage threshold or below an estimated ground speed threshold.

In one embodiment, the maximum engine speed value considered at blocks 312 and 314 represents the theoretical maximum speed that engine 130 is capable of achieving, and the maximum ground speed value considered at block 314 represents the theoretical maximum ground speed that vehicle 10 is capable of achieving. In one embodiment, the maximum engine speed, maximum ground speed, and other predefined calibration values of FIG. 5 are stored in a calibration file stored in controller 246 or that is communicated by controller 102 to power steering controller 246. The calibration file may further include the speed profiles 140, 142.

In some embodiments, controller 246 uses additional calibration values or inputs to further refine the steering torque assist level calculated at block 316. For example, in some embodiments controller 246 further uses a selected gear of the transmission 122, as described herein. In some embodiments, controller 246 further uses an engagement speed of a clutch of a CVT transmission 122 (FIG. 2) to determine the steering torque assist. For example, a delay may occur from when the engine speed first increases from idle speed to when the CVT transmission 122 engages the CVT belt and causes the vehicle to move. In particular, the CVT sheaves engage the belt at a threshold engine speed (i.e., an engagement RPM) to transfer torque to the wheels. Torque is not applied to the wheels over the low engine speed range between engine idle speed and the threshold engagement engine speed. An exemplary engine idle speed is 1200 RPM, and an exemplary threshold engine speed is 3000 to 3500 RPM, although other suitable idle and engagement engine speeds may be provided depending on vehicle configuration. In some embodiments, steering torque assist is delayed or reduced by controller 246 until the threshold engine speed is reached and the transmission 122 engages the belt to rotate the wheels and move the vehicle.

Controller 246 may use other suitable variables or constants to determine the steering torque assist. For example, controller 246 may adjust the steering assist based on the driveline condition of the vehicle, including the transmission gear, the number of wheels driven by the engine, and the state of the differential(s) 145 (FIG. 2), i.e., open, locked, or controlled slip state. For example, the vehicle may include a first driveline configuration wherein the engine drives two wheels 24b of the vehicle 10 (i.e., 2WD) and a second driveline configuration where the engine drives all four wheels 24a, 24b (FIG. 1) of the vehicle 10 (4WD). In one embodiment, controller 246 applies more steering torque assist in the 4WD configuration than in the 2WD configuration for a given user torque input. In one embodiment, controller 246 applies more steering torque assist in the locked differential configuration than in the open differential configuration for a given user torque input.

In some embodiments, controller 246 further receives at block 316 of FIG. 5 an input indicative of a gear selection of transmission 122 of FIG. 2. The transmission gear may be detected via CAN bus, proximity sensor, mechanical switch, operator input device, or other suitable detection mechanisms. In this embodiment, controller 246 adjusts the level of the power steering torque assist at block 316 of FIG. 5 based on the selected transmission gear. The selected transmission gear may be the gear ratio of a discrete gear ratio transmission, a gear ratio of a CVT transmission, and/or a gear ratio of a sub-transmission. For example, in one embodiment sub-transmission 124 includes a low-range gear and a high-range gear. The low range gear provides increased power and lower speed operation than the high range gear. For example, the low range gear may be used for towing, plowing, rock crawling, hauling, or other work operations, and the high range gear may be used for traveling at higher speeds or in non-loaded conditions. In the illustrated embodiment, controller 246 provides increased levels of steering torque assist in the low-range gear and reduced levels of steering torque assist in the high range gear of sub-transmission 124.

Figure 6:
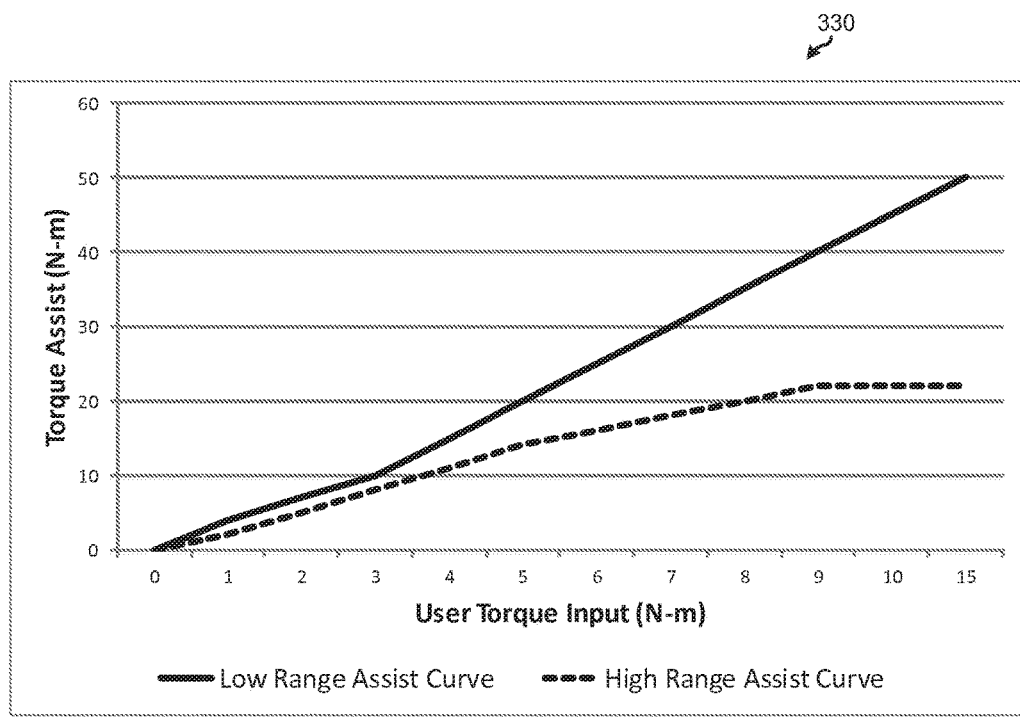
FIG. 6 is an exemplary graph illustrating power steering assist levels based on input steering torque and vehicle speed for low-range and high-range transmission gears.

FIG. 6 illustrates a graphical representation 330 of an exemplary torque assist level mapping for low- and high-range gears of sub-transmission 124 for a given estimated ground speed (Equation (2) described above) and/or a given estimated throttle opening percentage (Equation (1) described above). The x-axis represents the level of user torque input 240 (FIG. 4), and the y-axis represents the level of steering torque assist output by power steering unit 252, each represented in units of Newton meters (N-m). In the illustrated embodiment, more torque assist is provided in the low-range gear at the given ground speed than in the high-range gear at the given ground speed across the range of user torque input. In one embodiment, a torque assist curve, such as the curve of FIG. 6, is stored in memory of power steering unit 252 for each of a plurality of ground speeds and/or throttle opening percentages. The torque assist curves may also be received from controller 102 in a calibration file.

In one embodiment, vehicle 10 further includes an adjustable stabilizer bar 144 coupled to the front steering assembly, as illustrated in FIG. 2. Stabilizer bar 144 includes an actuator controlled by controller 102 (or controller 246 of FIG. 4) for variable adjustment. In one embodiment, the engagement/disengagement and the stiffness of the stabilizer bar 144 is controlled and adjusted by controller 102. The state of stabilizer bar 144 is communicated by controller 102 to power steering controller 246. In one embodiment, power steering controller 246 applies more steering assist when stabilizer bar 144 is disengaged and/or at low stiffness levels than when stabilizer bar 144 is engaged and/or at high stiffness levels. In one embodiment, the level of power steering assist may be inversely proportional (linearly or at multiple discrete levels) to the level of stiffness of stabilizer bar 144.

Referring again to FIG. 5, in another embodiment controller 246 implements a fixed assist mode at block 320 as the alternative power steering control scheme of block 308. In this embodiment, when the ground speed error is detected at block 304 of FIG. 5, controller 246 applies a steering torque assist curve that corresponds to a preselected fixed vehicle speed. For example, controller 246 applies steering torque assist based on a stored torque assist curve for a particular ground speed, such as 30 mph or any other suitable ground speed. Accordingly, the steering torque assist level varies according to the user torque input 240 and the assist curve corresponding to the selected fixed ground speed. The steering torque assist level in the fixed assist mode of block 320 may vary further based on other inputs, such as the driveline condition, transmission clutch engagement speed, and/or stabilizer bar configuration described herein.

Controller 246 of power steering unit 252 is further operative to execute a self-diagnosis to determine whether a torque bias or offset has drifted from a factory programmed offset (i.e., from a reference calibration). The factory programmed offset may be initially zero or any other suitable torque offset. The factory programmed offset is configured to zero or align the steering system when no external forces are applied to the steering system, such as, for example, a user steering torque input or a force applied to the wheel by an external object. In one embodiment, the torque offset is determined based on a sensed position of a shaft of the steering unit 252 relative to a reference position. For example, the offset may be determined via a torque or position sensor based on a rotational position of an input shaft of power steering unit 252 relative to an output shaft of power steering unit 252. In one embodiment, the torque offset is determined based on a detected change in the location of the torque sensor on the power steering system, e.g., on a steering shaft. Controller 246 is operative to perform an operation to automatically detect and correct a drifted torque offset, as described below.

The calibration of the power steering unit 252 may become inaccurate, for example, due to an impact to a shaft of the unit 252 or steering assembly or due to other conditions. In some conditions, a drifted offset bias of the power steering unit 252 may result in a left or right steering bias wherein the unit 252 improperly applies greater torque assist in one turning direction than in another turning direction. As an example, a 10 Newton meter (Nm) offset bias in power steering unit 252 may cause up to a 10% bias to the controlled output torque assist level.

In the illustrated embodiment, controller 246 performs a self-check at each ignition cycle of vehicle 10 and therefore at each power-up of unit 252. Vehicle 10 is normally "at-rest" at power-up in that the steering assembly normally has no external forces applied to it. For example, the user input torque via steering wheel 182 (FIG. 3) and other external steering forces are zero in most at-rest conditions. Controller 246 detects the input torque using torque sensing device 248 (FIG. 4), as described herein. In one embodiment, the input torque is determined by the angular displacement (i.e., offset) between two steering shafts of steering assembly 180 (FIG. 3), such as the input steering shaft 250 and output steering shaft 264 of FIG. 3. Other suitable methods of determining input torque may be provided. The input torque is positive for one steering direction and negative for the opposite steering direction.

If a detected input torque or angular difference is outside a tolerance range stored in memory at vehicle power-up, the device records the deviation in non-volatile memory, as described herein. The tolerance range may include, for example, a lower limit of −2 Nm torque difference and an upper limit of +2 Nm torque difference from the expected zero offset in the at-rest condition, although any suitable tolerance range may be provided. After a predetermined number of ignition cycles where the detected input torque or angular displacement is out of range, controller 246 applies incremental or gradual correction factors at subsequent power up events until the unit 252 reaches a point when the monitored angular difference is within the tolerance window or range at startup. Controller 246 may log data at every startup or only on startups when the parameter(s) are out of range. The self-check sequence may be stored as code in memory accessible by controller 246.

Figure 7:
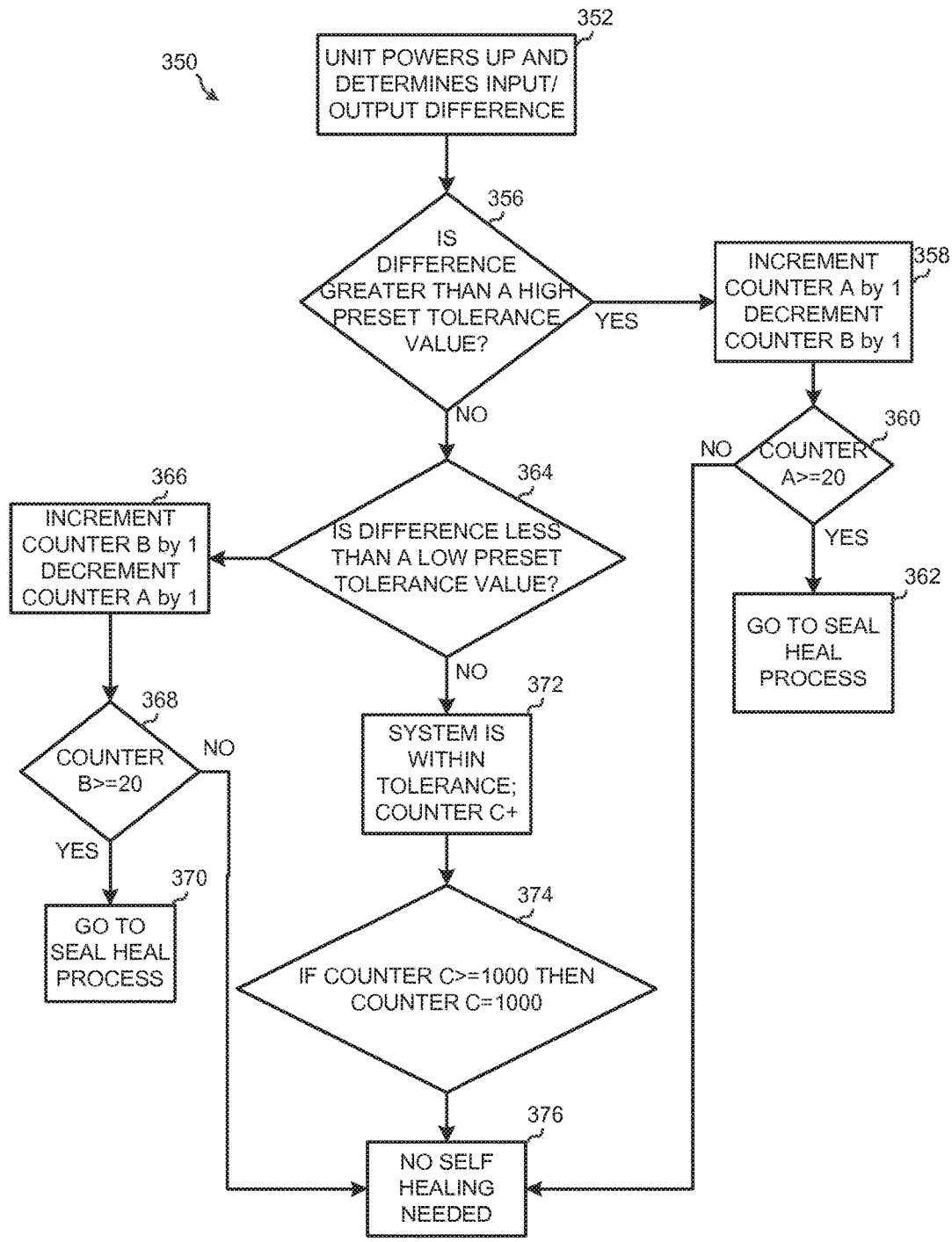
FIG. 7 is a block diagram illustrating an exemplary method for determining whether a calibration of the power steering unit of FIG. 2 is within a tolerance range.

FIG. 7 illustrates a flow diagram 350 of an exemplary method executed by controller 246 of FIG. 4 of self-checking the calibration of the power steering unit 252. At block 352, power steering unit 252 powers up following the ignition cycle, and controller 246 determines the angular difference between the input and output steering shafts, i.e., the input torque to steering assembly 180. At block 356, controller 246 determines whether the input/output angular difference is greater than an upper limit preset tolerance value stored in memory. If the difference exceeds the upper limit preset tolerance value at block 356, controller 246 increments a Counter A by 1 and decrements a Counter B by 1 at block 358. At block 360, if the Counter A is greater than or equal to a value of 20, controller 246 executes the self-heal process at block 362, as described herein with respect to FIG. 8. If the Counter A is less than 20 at block 360, controller 246 determines that the self-heal process is not yet required at block 376 and execution of method 350 is complete until the next ignition cycle.

If the input/output difference is not greater than the upper limit preset tolerance value at block 356 but is less than the lower limit preset tolerance value at block 364, controller 246 increments the Counter B by 1 and decrements the Counter A by 1 at block 366. In one embodiment, the lower limit preset tolerance value is a negative number indicative of an offset in the opposite steering direction. At block 368, if the Counter B is greater than or equal to a value of 20, controller 246 executes the self-heal process at block 370, as described herein with respect to FIG. 8. If the Counter B is less than 20 at block 368, controller 246 determines that the self-heal process is not required at block 376 and execution of method 350 is complete until the next ignition cycle.

As such, controller 246 initiates the self-heal process after a threshold consecutive number (e.g., 20=A=B) of ignition cycles where the calibration offset of the power steering unit 252 is either greater than the upper tolerance value or less than the lower tolerance value. In one embodiment, the requirement for a threshold number of consecutive instances when the calibration offset is out of the tolerance range serves to reduce the likelihood of initiating the self-heal process under improper conditions. For example, if the detected input torque is due to acceptable external forces such as an operator applying steering torque at startup or the wheel being parked at an angle against an object at startup, the self-heal process should not be executed.

If the input/output angular difference is within the tolerance range, controller 246 determines at block 372 that the power steering unit 252 is operating within the correct calibration tolerance. In one embodiment, controller 246 increments a Counter C by 1 at block 372. At block 374, if Counter C is greater than 1000, Counter C is held at 1000. As such, controller 246 illustratively keeps a record of the number of consecutive ignition cycles (illustratively up to 1000 cycles) that the power steering unit 252 is within the calibration tolerance range. At block 376, controller 246 determines that the self-heal process is not required and execution of method 350 is complete until the next ignition cycle.

In some embodiments, controller 246 performs a consistency check for the out of tolerance condition to expedite execution of the self-heal process. For example, at each execution of method 350 (illustratively at each ignition cycle), controller 246 compares the last measured out of tolerance value (e.g., the previous input/output angular difference measured at the previous ignition cycle) to the currently measured out of tolerance value (e.g., the current input/output angular difference). If the last measured out of tolerance value is within a threshold range R of the currently measured out of tolerance value for a predetermined consecutive number of ignition cycles, the self-heal process is initiated after the predetermined consecutive number of ignition cycles, which is less than the Counters A or B. For example, the predetermined consecutive number of ignition cycles may be five or ten or any suitable threshold number less than Counters A and B. The threshold range R may be any suitable range, such as within 1 or 2 nm. Accordingly, in this embodiment, if a same or similar out of tolerance value is observed in a threshold number of consecutive ignition cycles, the self-heal process is initiated prior to reaching the number identified with Counters A or B to expedite the self-heal process.

Figure 8:
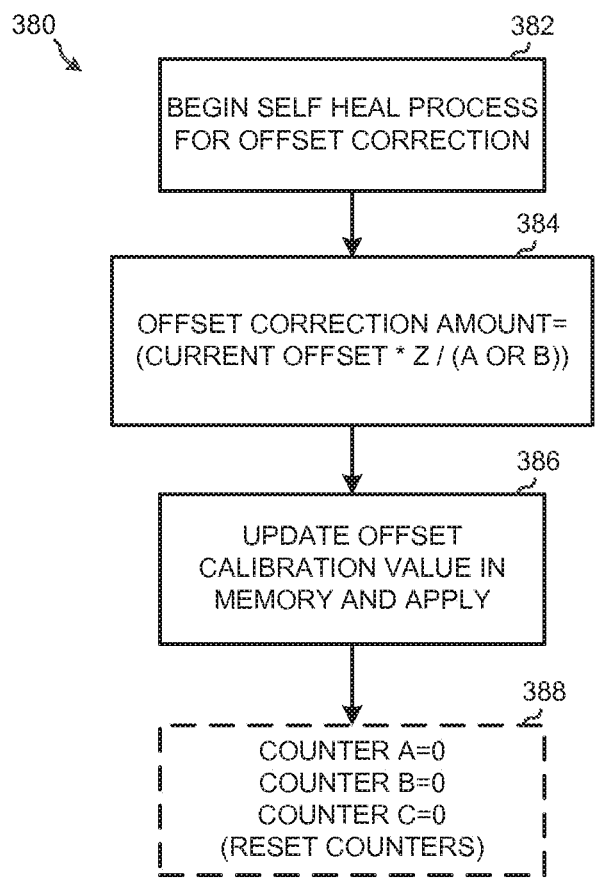
FIG. 8 is a block diagram illustrating an exemplary method for correcting a calibration offset determined in the method of FIG. 7 that is outside the tolerance range.

When controller 246 determines that the self-heal process is required at block 362 or block 370 of FIG. 7, controller 246 executes the self-heal process. Referring to FIG. 8, an exemplary self-heal method for positive or negative offset correction is illustrated in flow diagram 380 and begins at block 382. At block 384, controller 246 calculates an amount of offset correction. In the illustrated embodiment, controller 246 determines the offset correction by dividing the current detected offset (e.g., the input/output angular difference) by Counter A for positive offset or by Counter B for negative offset. Controller 246 multiplies that product by Multiplier Z. Multiplier Z is a multiplier used to increase or decrease the amount of incremental offset correction that is applied per iteration of the self-heal process. For example, if A and Z for positive offset (or B and Z for negative offset) are both equal to 20, the amount of offset correction equals the amount of the detected offset, and the entire offset correction is applied at once. If Z is less than the value of the applicable Counter A or B, a fractional amount of correction is applied. For example, if Z equals 1 and Counter A (or B) equals 20, then one twentieth of the detected current offset is applied as the correction offset on this iteration. As such, an incremental adjustment to the calibration is calculated and implemented by controller 246. After a number of ignition cycles, the incremental corrections will eventually bring the offset to within the tolerance range. Other suitable formulas for calculating the offset correction amount may be provided.

If the detected offset is positive, the offset correction has a negative value, and if the detected offset is negative, the offset correction has a positive value, thereby bringing the actual offset back within tolerance range. At block 386, controller 246 updates the offset calibration in memory based on the offset correction amount and applies the offset correction to power steering unit 252. In one embodiment, controller 246 applies the offset correction by compensating for the offset correction in the power steering assist commands to motor 252 (FIG. 3). At block 288, controller 246 optionally resets the counters including Counter A (for positive offset correction), Counter B (for negative offset correction), and Counter C.

In some embodiments, for existing power steering units 252 that have an offset bias with one or more components (e.g., steering shafts), faster self-healing may be accomplished by continuously cycling the ignition on and off to simulate multiple days or weeks of operator usage in a shorter time (e.g., in minutes). For example, a dealer may cycle the ignition multiple times over a short period so that controller 246 applies the incremental changes to the offset at an accelerated rate. Controller 246 may also be programmed to implement the self-check of FIG. 7 upon detecting a triggering event other than an ignition cycle, such as a user input requesting a self-check or a pre-ignition battery-on event, for example. In some embodiments, controller 246 is operative to detect leaky bucket type counters, to reset the Counters A and B to zero on predetermined events, and/or to implement accelerated counter conditions for use by a dealer to invoke a rapid heal condition.

Figure 9:
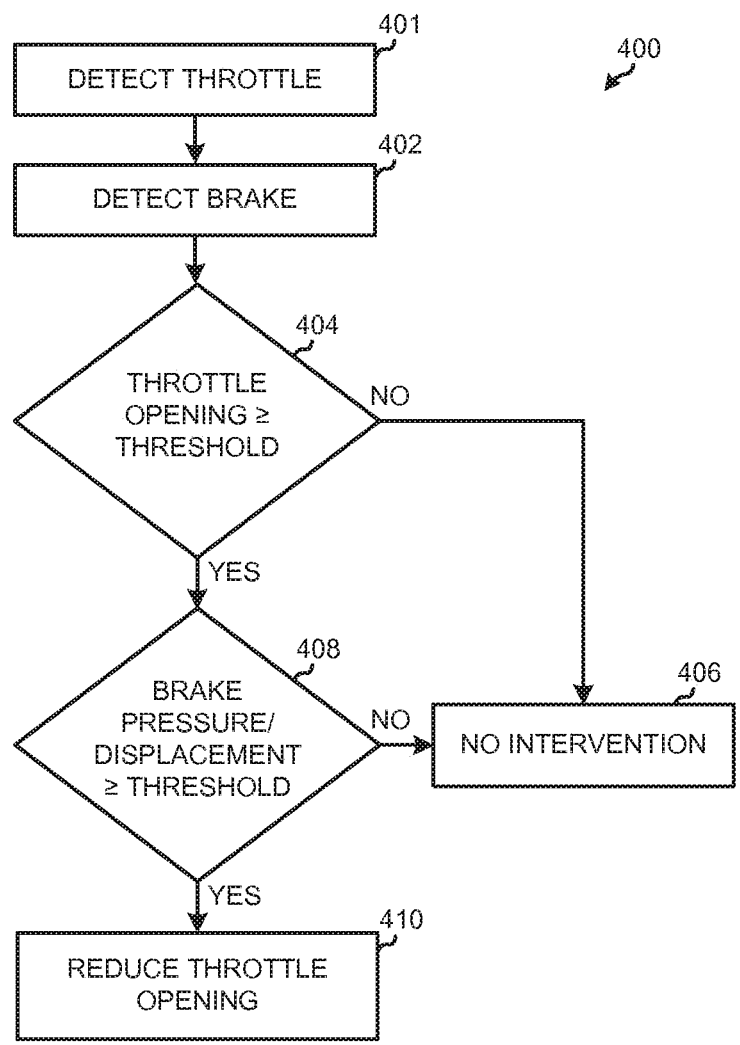
FIG. 9 is a block diagram illustrating an exemplary method for throttle override.

Referring to FIG. 9, controller 102 of FIG. 2 is further operative to execute a throttle override control for vehicle 10. FIG. 9 illustrates a flow diagram 400 of an exemplary method of overriding control of throttle valve 114 (FIG. 2) when brake operator 134 of FIG. 2 (or the vehicle brake) is applied. In some embodiments, the throttle override method of FIG. 9 serves to release a stuck or jammed throttle valve 114 or to close the throttle valve 114 when throttle operator 126 is stuck or jammed. In some embodiments, the brake throttle override method of FIG. 9 serves to reduce the likelihood of the brake and the throttle being applied at the same time. Reference is made to FIG. 2 throughout the following description of FIG. 9.

At block 401, controller 102 detects application of the throttle. For example, controller 102 may detect a displacement of at least one of throttle operator 126 and throttle valve 114 to detect application of the throttle. At block 402, controller 102 detects the application of brake operator 134 (e.g., brake pedal) based on a signal output from brake operator sensor 136. In the illustrated embodiment, brake operator sensor 136 is operative to detect at least one of a pressure applied to brake operator 134 and a displacement of brake operator 134. If the opening or position of throttle valve 114 (or the displacement of throttle operator 126) is greater than or equal to a first threshold at block 404, and if the detected brake operator pressure (or brake operator displacement) is greater than or equal to a second threshold at block 408, controller 102 reduces the opening of throttle valve 114 at block 410 regardless of an operator demand for a greater throttle valve opening. In one embodiment, controller 102 closes the throttle valve 114 at block 410 to a zero percent opening. In another embodiment, controller 102 reduces the opening of throttle valve 114 to at or below the first threshold opening.

In some embodiments, controller 102 waits a predetermined delay after detecting the brake application before reducing the throttle opening a calibrated amount. For example, upon detecting the brake operator pressure or displacement exceeding the second threshold at block 408 for a threshold time (e.g., one second, two seconds, or any suitable delay), controller 102 then reduces the throttle opening at block 410. In some embodiments, reducing the throttle opening at block 410 includes calibrating a ramp down of the throttle opening. In particular, the throttle valve opening is gradually reduced to the target reduced opening in response to the detected brake application exceeding the threshold.

In some embodiments, the first threshold of block 404 may be a zero percent throttle opening, a five percent throttle opening, or another suitable throttle opening. In some embodiments, the second threshold of block 408 may be a five percent total applied pressure or a five percent displacement of brake operator 134 or another suitable pressure or displacement value. In one embodiment, the first and second thresholds are adjustable by the operator or dealer based on user input provided via the user interface of vehicle 10. In an alternative embodiment, the position of the vehicle brake may be detected at block 402 and compared with a corresponding threshold at block 408.

If the throttle valve opening at block 404 is less than the first threshold value, or if the brake pressure or displacement at block 408 is less than the second threshold value, controller 102 does not intervene to close or reduce the opening of throttle valve 114, as represented at block 406.

Figure 10:
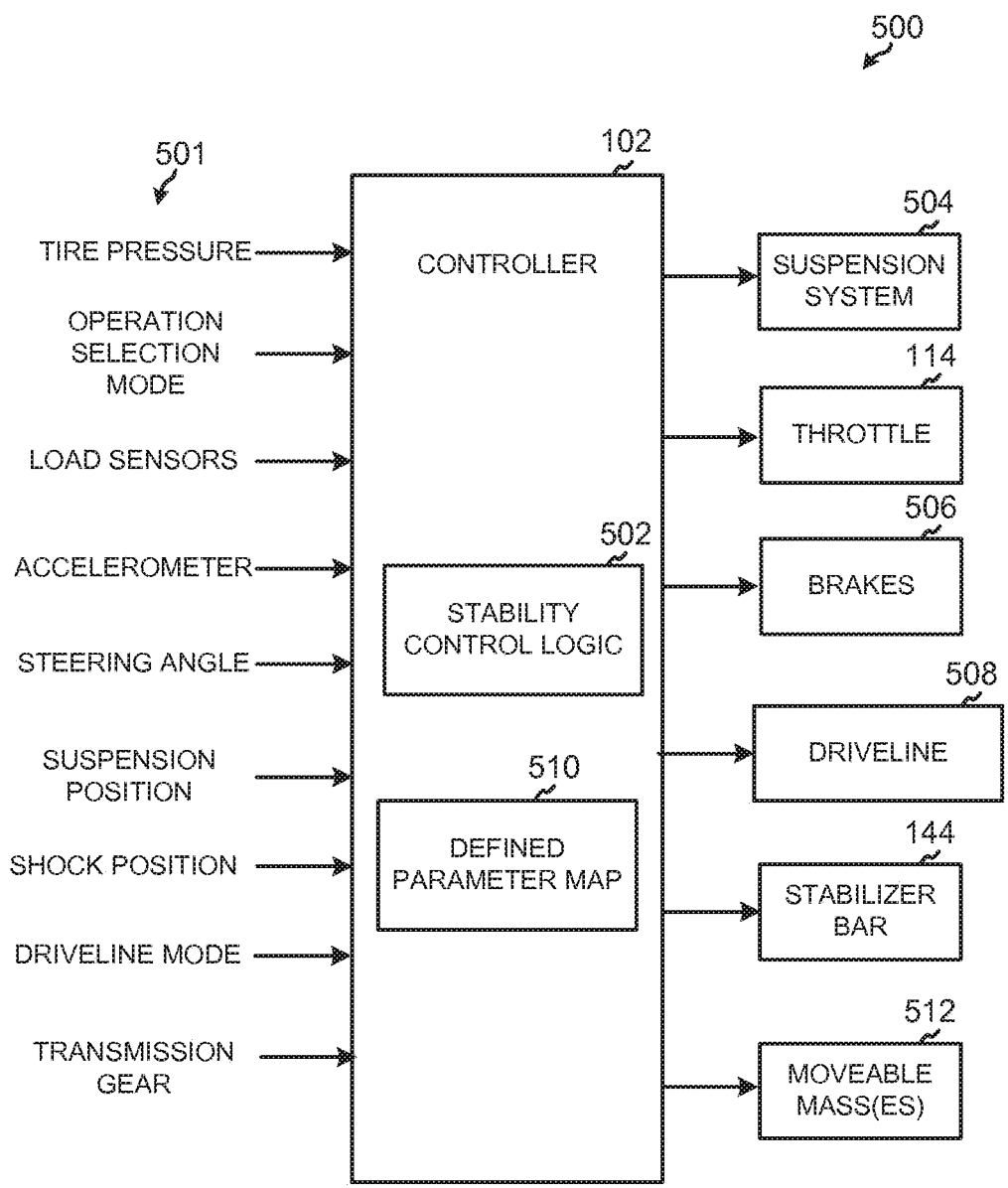
FIG. 10 is representative view of a stability control system of the vehicle of FIG. 1.

Controller 102 of FIG. 2 is further operative to provide stability control to vehicle 10. Referring to FIG. 10, an exemplary stability control system 500 is illustrated. Controller 102 includes stability control logic 502 operative to implement various control measures to stabilize vehicle 10 during vehicle operation based on monitored vehicle parameters. Controller 102 receives inputs 501 from sensors such as tire pressure, an operation selection mode (e.g., racing mode, sand dune mode, trail riding mode, work mode, snow/ice mode, etc.), load sensor output, accelerometer output, inclinometer output, steering angle, suspension and shock position, selected driveline mode (e.g., 2WD or 4WD, state of differential, transmission gear, etc.), and other suitable inputs. In one embodiment, the controller 102 receives inputs from three-axis accelerometers and three-axis gyroscopes mounted to vehicle 10. In one embodiment, an accelerometer and gyroscope are mounted inside an engine control unit (ECU) of vehicle 10 (e.g., controller 102).

Based on one or more of inputs 501, stability control logic 502 actively controls various systems and subsystems to improve the stability of vehicle 10.

For example, stability control logic 502 adjusts the shocks and springs of the suspension system 504 of vehicle 10 to improve stability. For additional detail on damping control and adjustment of shock absorbers and springs, see U.S. application Ser. No. 14/074,340, filed Nov. 7, 2013, and U.S. application Ser. No. 14/507,355, filed Oct. 6, 2014, both entitled VEHICLE HAVING SUSPENSION WITH CONTINUOUS DAMPING CONTROL, the entire disclosures of which are expressly incorporated by reference herein.

In one embodiment, stability control logic 502 controls the throttle valve 114 and brakes 506 of vehicle 10 to provide stability control in various vehicle conditions. In one embodiment, logic 502 locks and unlocks differentials 145 (FIG. 2) of driveline 508 to provide additional vehicle stability. In one embodiment, logic 502 engages and adjusts the stiffness of torsion (stabilizer) bar 144 to provide additional vehicle stability. In one embodiment, controller 102 further controls one or more moveable masses 512 to adjust vehicle weight distribution, as described herein.

Figure 11:
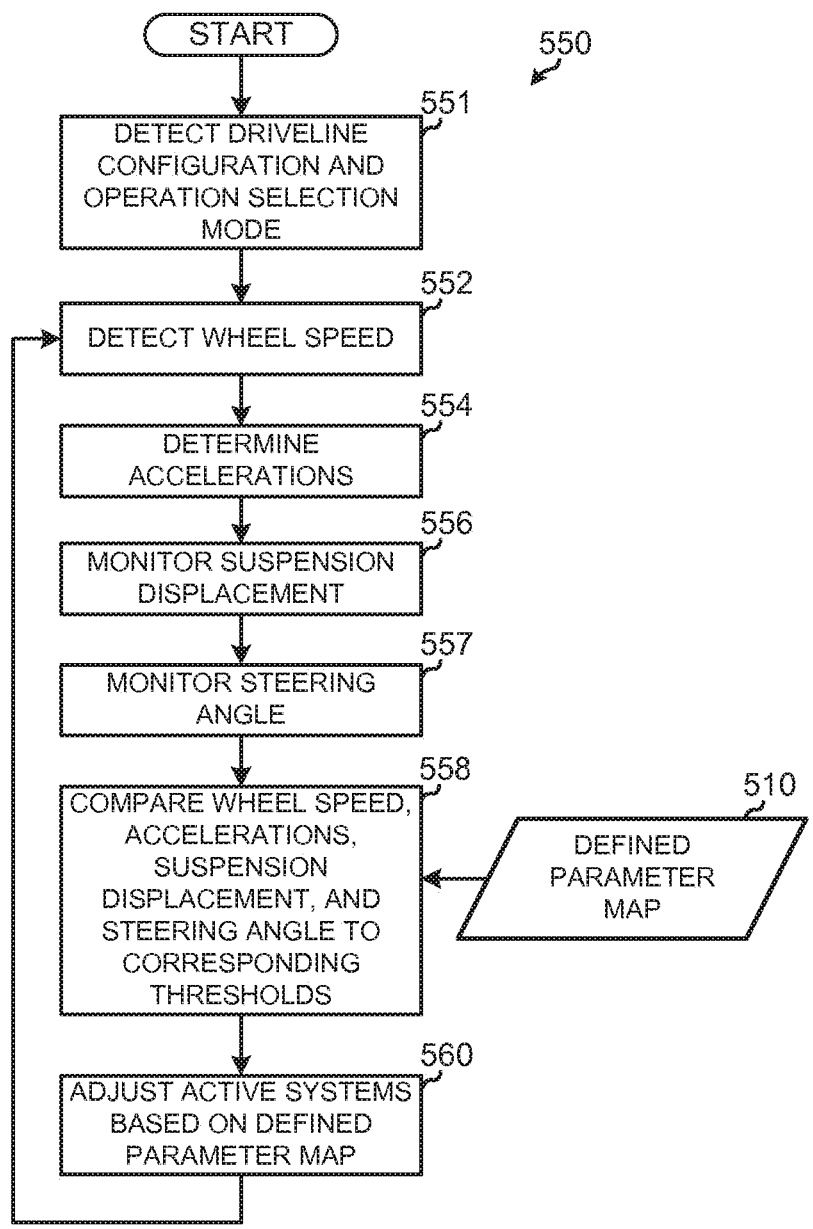
FIG. 11 is a block diagram illustrating an exemplary method for adjusting active vehicle systems based on a terrain traversed by the vehicle of FIG. 1.

FIG. 11 illustrates a flow diagram 550 of an exemplary method of controlling vehicle stability based on various terrains traversed by vehicle 10. At block 551, controller 102 detects a driveline configuration selected by an operator based on user input and sensor output. As described herein, the driveline configuration includes the number of driven wheels (e.g., 2WD or 4WD), the state of the differential (e.g., open, locked, or controlled slip), and/or the selected transmission gear ratio. At block 551, controller 102 also detects an operation selection mode (e.g., racing mode, sand dune mode, trail riding mode, work mode, snow/ice mode, etc.) selected by a user via mode selector 118 (FIG. 2), as described herein. At block 552, controller 102 detects a wheel speed of vehicle 10 based on output from speed sensor 110 (FIG. 2). At block 554, controller 102 determines one or more vehicle accelerations. For example, controller 102 determines the wheel acceleration based on the detected wheel speed and linear and angular accelerations of vehicle 10 based on accelerometer output. At block 556, controller 102 monitors the suspension displacement based on output from one or more suspension sensors 138 (FIG. 2). For example, a shock position at each wheel may be monitored at block 556 to detect a compression or expansion of the shocks or springs, and a suspension position may be monitored at block 556 to detect the height of the chassis relative to the wheels. At block 557, controller 102 monitors the steering angle of the steering assembly, such as steering assembly 180 of FIG. 3.

At block 558, controller 102 compares the detected parameters, including for example the wheel speed, wheel and vehicle accelerations, the suspension displacement, and the steering angle, to corresponding thresholds defined in a parameter map 510 calibrated for various terrains traversed by the vehicle 10. Parameter map 510 is illustratively stored in memory of controller 102 (FIG. 10). The defined parameter map 510 provides thresholds for various terrain conditions. In one embodiment, one or more thresholds in defined parameter map 510 are based on the driveline configuration of vehicle 10 and an operation selection mode identified at block 551 (e.g., racing mode, sand dune mode, trail riding mode, work mode, snow/ice mode, etc.). For example, one or more thresholds in defined parameter map 510 have different values for different driveline conditions and operation modes. Based on the comparison of the detected parameters to the thresholds in defined parameter map 510, controller 102 is operative to adjust active systems of vehicle 10 at block 560 to improve vehicle stability in different terrain conditions.

For example, suspension displacement is monitored and compared to the detected vehicle speed to determine the rate the shocks are moving at the detected vehicle speed. As the suspension displacement rate exceeds various thresholds at different speeds, the harshness or smoothness of the terrain may be determined and adjustment to active systems may be implemented. A comparison of accelerometer output to acceleration thresholds is also used to determine the harshness of the terrain, such as to determine the suspension displacement rate and/or to detect sudden accelerations (e.g., angular or linear) of vehicle 10 in various directions due to bumpy terrain. Further, wheel acceleration in combination with shock displacement and accelerometer output is used by controller 102 to determine slick or low traction conditions, such as with ice/snow, gravel, or sand terrains. Based on the wheel speed, the shock displacement, the rate of shock displacement, vehicle accelerations, and/or driveline configuration, controller 102 determines the harshness or roughness of the terrain based on the defined parameter map 510.

Controller 102 at block 560 adjusts the operation and calibration of one or more active systems of vehicle 10 to provide improved stability for vehicle 10 based on the comparisons of block 558. For example, one or more active systems are adjusted by controller 102 in response to a harsher or smoother terrain. In one embodiment, the active systems are adjusted based on the defined parameter map 510 according to the driveline configuration and the operation selection mode, as described herein. Exemplary active systems that are adjusted at block 560 include suspension (e.g., shock and/or spring damping and vehicle height), stabilizer bar 144, braking, electronic throttle control, power steering, moveable masses 512, transmission gear, and driveline configuration (4WD vs 2WD, differential engagement, etc.). Controller 102 actively monitors feedback from each of these systems and adjusts the configuration of one or more of these systems to dynamically improve vehicle stability.

In one embodiment, controller 102 uses parameter map 510 to adjust the stiffness of the suspension system 139 (FIG. 2), including the shocks and/or springs, based on the terrain. For example, low suspension displacement at higher vehicle speeds is indicative of a smooth terrain, such as a road terrain, for example. Accordingly, upon detection of the suspension displacement and/or displacement rate being below a first displacement threshold and the vehicle speed exceeding a high speed threshold, controller 102 increases the stiffness of suspension system 139. Upon detection of the suspension displacement and/or displacement rate exceeding a second displacement threshold and the vehicle speed being below a low speed threshold, which is indicative of a rough terrain, controller 102 decreases the stiffness of suspension system 139 to soften vehicle 10. In one embodiment, the first displacement threshold is less than the second displacement threshold. In one embodiment, the low speed threshold is less than the high speed threshold, although the low and high speed thresholds may alternatively be the same. The stiffness of the suspension may be adjusted based on a fluid level in the shocks or a position of the shocks or springs, as described in U.S. application Ser. No. 14/507,355, filed Oct. 6, 2014, entitled VEHICLE HAVING SUSPENSION WITH CONTINUOUS DAMPING CONTROL.

In one embodiment, controller 102 uses parameter map 510 to adjust the vehicle ride height (load level) of vehicle 10 based on the terrain. The vehicle ride height is adjusted with suspension system 139, such as by adjusting the position of the springs or shocks. In one embodiment, controller 102 lowers the vehicle ride height in response to detecting rough terrain, i.e., detecting the suspension displacement and/or displacement rate exceeding a threshold for a corresponding vehicle speed. Further, controller 102 lowers the vehicle ride height in smooth terrain at high vehicle speeds. For example, in response to the suspension displacement and/or displacement rate being below a threshold and the vehicle speed exceeding a high speed threshold, controller 102 lowers the vehicle ride height by a predetermined amount.

In one embodiment, controller 102 uses parameter map 510 to adjust the stiffness of stabilizer bar 144 (FIG. 2) based on the terrain. In response to detecting smooth terrain, controller 102 increases the stiffness of stabilizer bar 144. In response to detecting rough terrain, controller 102 decreases the stiffness of stabilizer bar 144. The smooth and rough terrain is detected based on displacement and speed thresholds of parameter map 510 as described above.

In one embodiment, controller 102 uses parameter map 510 to adjust the driveline configuration based on the terrain. For example, controller 102 changes the driveline between 2WD and 4WD configurations and/or between states of the differential based on the terrain. The smooth and rough terrain is detected based on displacement and speed thresholds of parameter map 510 as described above. In one embodiment, controller 102 changes the driveline configuration by changing from an open or locked state of the differential to a controlled slip state. In the controlled slip state, the controller adjusts a slip of the differential based on a detected steering angle and a detected yaw rate of the vehicle.

In one embodiment, controller 102 is further operative to actively control one or more active systems upon detection of an airborne condition to improve the trajectory and landing of vehicle 10. See, for example, the exemplary airborne controls disclosed in U.S. patent application Ser. No. 13/652,253, filed Oct. 15, 2012, entitled PRIMARY CLUTCH ELECTRONIC CVT, the entire disclosure of which is expressly incorporated by reference herein.

In some embodiments, components and systems of vehicle 10 are packaged for improved weight distribution depending on the intended vehicle use. Vehicle 10 may be manufactured with a different weight distribution depending on the vehicle model. For example, the manufacturer may receive an order that identifies a targeted operating environment of the vehicle, such as trail riding, work operations, racing, etc. The manufacturer configures the weight distribution of the vehicle based on the intended operating environment. For example, for a vehicle 10 that is intended for racing or airborne conditions, the vehicle 10 may be configured such that a greater mass is towards the front and rear ends of the vehicle 10 to provide additional stability in the air. Components such as engine 130, the radiator, generator, engine crank shaft, spare tire, fake weight, and/or battery 109 (FIG. 2) are therefore positioned closer to the front or rear ends of vehicle 10 for improved weight distribution and improved pitch inertia. Similarly, for a vehicle 10 intended for slower speeds and tight turns and not intended for airborne conditions, such as for trail riding or work operations, the mass is positioned more towards the center of the vehicle 10 to provide less pitch inertia.

In some embodiments, vehicle 10 includes one or more movable masses 512 (FIG. 10) to allow an operator or dealer to vary the weight distribution of vehicle 10 after purchase of the vehicle 10. The moveable masses 512 are either automatically moved by actuators of vehicle 10 controlled by controller 102 or manually moved by an operator prior to vehicle operation. For example, vehicle 10 may be configured such that an operator or dealer manually moves the location of various components on the vehicle 10, such as the battery 109, radiator, seat, generator, engine crank shaft, spare tire, fake weight, or other suitable components, based on the intended operating environment. In another embodiment, the operator selects an operation selection mode via mode selector 118 (FIG. 2), and controller 102 automatically controls actuators to move the moveable masses 512 based on the selected operation mode. For example, controller 102 moves masses 512 towards the front and rear ends of vehicle 10 in response to user selection of a sand dune mode or racing mode, and controller 102 moves masses 512 towards the center of vehicle 10 in response to user selection of a trail mode or work mode. Further, vehicle 10 may include a spare tire carrier that is attached to the rear end of vehicle 10 for improved weight distribution. The spare tire carrier may be filled with water to add additional mass. Further still, a detachable front or rear bumper may be provided to add mass to an end of vehicle 10. In addition, flywheels may be mounted to vehicle 10 to further target a specific weight distribution of vehicle 10.

In some embodiments, stability control system 500 of FIG. 10 is operative to automatically vary the location of one or more movable masses 512 (FIG. 10) actively during vehicle operation. For example, moveable masses 512 include a flywheel system or gyroscope system controlled by controller 102 to actively adjust mass distribution during vehicle operation based on the detected vehicle stability and/or detected terrain. The vehicle stability is detected by controller 102 based on various inputs such as vehicle speed, acceleration, operation mode, vehicle pitch or tilt, and other inputs. For example, a flywheel or gyroscope system is shifted during an airborne condition of vehicle 10 to level the vehicle 10 in response to detection of a vehicle pitch that exceeds a threshold, i.e., a vehicle pitch indicative of a nose dive or non-level condition. The flywheel or gyroscope system is also used to shift mass during turning or cornering operations of vehicle 10. In another embodiment, controller 102 automatically controls the application of the throttle and/or brake during the airborne condition to further improve the pitch of vehicle 10. For example, controller 102 selectively increases the throttle opening to increase driveline inertia and thereby cause the front end of the vehicle 10 to pitch up relative to the rear end of the vehicle, and controller 102 selectively applies the brakes to cause the front end of vehicle 10 to pitch downward relative to the rear end of vehicle 10.

In some embodiments, vehicle stability is improved by decreasing a steering speed of the steering rack (steering ratio). In some embodiments, the steering rack 258 of FIG. 3 is controlled to have a variable ratio based on vehicle speed. For example, for faster vehicle speeds the steering rack 258 has a lower speed and for slower vehicle speeds the rack 258 has a faster speed. In some embodiments, the steering rack ratio is controlled based on operation selection modes programmed into controller 102 of FIG. 2. For example, each drive mode has a variable speed ratio of the steering rack 258 to provide varying steering response based on desired vehicle performance.

In some embodiments, vehicle stability is improved by biasing the speeds of each driven wheel (e.g., wheels 24a, 24b of FIG. 1) for various steering conditions. Oversteering of vehicle 10 may occur when vehicle 10 has a low steering angle and a high yaw rate, and understeering of vehicle 10 may occur when vehicle 10 has a high steering angle and a low yaw rate. In some embodiments, controller 102 is operative to vary the relative speeds of individual wheels to reduce the oversteering or understeering of vehicle 10. For example, controller 102 adjusts the speeds of each wheel 24a, 24b to achieve target wheel speeds for certain steering angles of vehicle 10. In one embodiment, a motor is coupled to each differential (e.g., front, rear, and/or center differential) to control speed variations of each wheel 24a, 24b. Alternatively, a motor is coupled to each driven wheel to vary the speed of the corresponding wheel relative to other driven wheels. Controller 102 controls the motor(s) to vary individual wheel speeds based on the steering angle, the vehicle speed, and yaw or acceleration rates of vehicle 10. In one embodiment, braking of one or more wheels is further used to reduce oversteering and understeering of vehicle.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A power steering method for a vehicle, the method including:
    detecting, by a controller of a power steering system, a selected gear of a transmission of the vehicle and an engine speed of the vehicle;
    detecting a ground speed of the vehicle;
    determining an error corresponding to the ground speed of the vehicle;
    determining, by the controller, a power steering assist level based on the selected gear of the transmission, a user torque input to a steering assembly of the vehicle, the error corresponding to the detected ground speed, and the engine speed of the vehicle; and
    outputting, by the power steering system, steering torque assistance to the steering assembly of the vehicle based on the power steering assist level.

2. The method of claim 1, further comprising:
    determining a first power steering assist level for a low range gear of the transmission and a second power steering assist level for a high range gear of the transmission, the first power steering assist level being greater than the second power steering assist level.

3. The method of claim 1, further including determining, by the controller, an estimated ground speed of the vehicle based on the engine speed, a predetermined engine speed, and a predetermined ground speed, wherein the determining the power steering assist level is further based on the estimated ground speed.

4. The method of claim 3, wherein the predetermined engine speed is a maximum engine speed, and the predetermined ground speed is a maximum ground speed.

5. The method of claim 1, further including detecting a driveline condition of the vehicle, wherein the determining the power steering assist level is further based on the driveline condition, wherein the driveline condition includes at least one of a number of wheels driven by an engine and a state of a differential of a driveline.

6. The method of claim 1, further including detecting a state of a stabilizer bar coupled to the steering assembly of the vehicle, wherein the determining the power steering assist level is further based on the state of the stabilizer bar.

7. The method of claim 6, wherein the state of the stabilizer bar includes at least one of an engaged state, a disengaged state, and a stiffness level of the stabilizer bar.

8. The method of claim 1, wherein the determining the error corresponding to the ground speed of the vehicle is based on the ground speed having an erroneous value, the ground speed having a value that exceeds a capability of the vehicle, the ground speed changes at a rate that exceeds a threshold rate, or the ground speed sensor failing to detect the ground speed.

9. A power steering method for a vehicle, the method including:
    detecting, by a controller of a power steering system, a selected gear of a transmission of the vehicle;
    detecting a state of a stabilizer bar coupled to a steering assembly of the vehicle;
    determining, by the controller, a power steering assist level based on the selected gear of the transmission, the state of the stabilizer bar, and a user torque input to the steering assembly of the vehicle; and
    outputting, by the power steering system, steering torque assistance to the steering assembly of the vehicle based on the power steering assist level.

10. The method of claim 9, wherein the state of the stabilizer bar includes at least one of an engaged state, a disengaged state, and a stiffness level of the stabilizer bar.

11. The method of claim 9, further comprising determining a first power steering assist level for a low range gear of the transmission and a second power steering assist level for a high range gear of the transmission, the first power steering assist level being greater than the second power steering assist level.

12. The method of claim 9, further including:
    receiving, from a ground speed sensor, a ground speed of the vehicle; and
    determining an error corresponding to the ground speed of the vehicle, wherein the determining the power steering assist level is further based on the error corresponding to the detected ground speed.

13. The method of claim 12, wherein the determining the error corresponding to the ground speed of the vehicle is based on the ground speed having an erroneous value, the ground speed having a value that exceeds a capability of the vehicle, the ground speed changes at a rate that exceeds a threshold rate, or the ground speed sensor failing to detect the ground speed.

14. The method of claim 9, further including detecting a driveline condition of the vehicle, wherein the determining the power steering assist level is further based on the driveline condition, and wherein the driveline condition includes at least one of a number of wheels driven by an engine and a state of a differential of a driveline.

15. The method of claim 9, further comprising:
    detecting, by the controller, an engine speed of the vehicle, and
    wherein the determining the power steering assist level is further based on the engine speed of the vehicle.

16. A power steering method for a vehicle, the method including:
    detecting, by a controller of a power steering system, a selected gear of a transmission of the vehicle and an engine speed of the vehicle;
    determining, by the controller, an estimated ground speed of the vehicle based on the engine speed, a predetermined engine speed, and a predetermined ground speed;

determining, by the controller, a power steering assist level based on the selected gear of the transmission, the estimated ground speed, and a user torque input to a steering assembly of the vehicle; and outputting, by the power steering system, steering torque assistance to the steering assembly of the vehicle based on the power steering assist level.

17. The method of claim 16, further comprising:

determining a first power steering assist level for a low range gear of the transmission and a second power steering assist level for a high range gear of the transmission, the first power steering assist level being greater than the second power steering assist level.

18. The method of claim 16, further comprising detecting a driveline condition of the vehicle, the determining the power steering assist level further being based on the driveline condition, wherein the driveline condition includes at least one of a number of wheels driven by an engine and a state of a differential of a driveline.

19. The method of claim 16, wherein the predetermined engine speed is a maximum engine speed, and the predetermined ground speed is a maximum ground speed.

\* \* \* \* \*